Jan. 26, 1932.  C. C. FARMER  1,842,518
WARNING DEVICE FOR FLUID PRESSURE
Filed Dec. 10, 1930

INVENTOR.
CLYDE C. FARMER
BY  Wm. N. Cady
ATTORNEY.

Patented Jan. 26, 1932

1,842,518

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

WARNING DEVICE FOR FLUID PRESSURE

Application filed December 10, 1930. Serial No. 501,410.

This invention relates to indicator devices and more particularly to the type associated with the fluid pressure brake equipment of a vehicle.

It is highly desirable that the operator of a motor vehicle should be advised whenever the source of power for operating the brakes is inadequate to control the brakes. For example, where the sub-atmospheric pressure created in the intake manifold of the internal combustion engine is utilized for braking purposes, if, for some reason, the partial vacuum is not high enough to properly apply the brakes and the operator then attempts to effect an application of the brakes, he will not obtain the desired brake application and it may then be too late to stop the car by other braking means.

It is common to employ a pressure gage for indicating the degree of fluid pressure of a source of supply, but a gage of this character does not attract the attention of the operator when a dangerous condition exists and he would have to continually view the gage in order to note when the danger condition takes place.

One object of my invention is to provide a warning device which positively attracts the attention of the operator when a danger condition occurs and exists.

Another object of my invention is to provide a device of the above character having a semaphore which will move into the operator's normal driving vision when the pressure of fluid at the source becomes such as to be unsafe for braking purposes.

Figure 2:
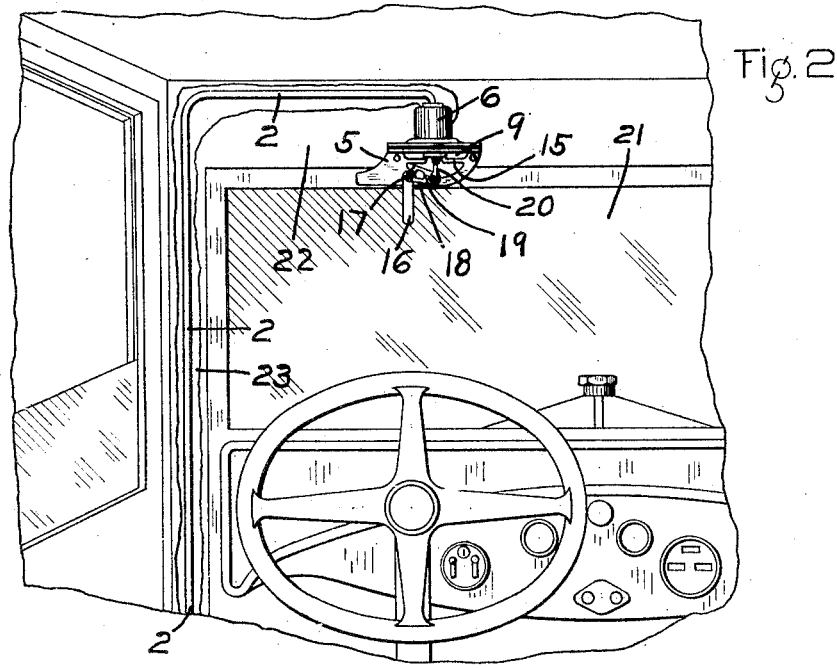
Figure 1:
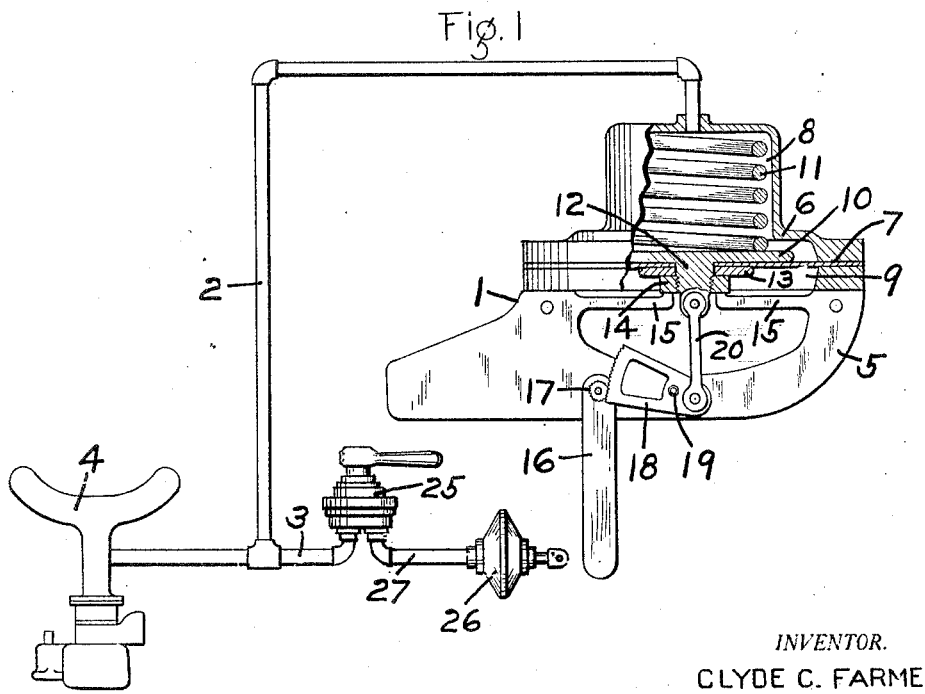

In the accompanying drawings: Fig. 1 is a diagrammatic view, mainly in section, of my improved indicator or warning device associated with the brake equipment of a vehicle; and Fig. 2 is a portion of a vehicle showing one manner in which the warning device may be installed in the vehicle.

As shown in Fig. 1 of the drawings, the warning device 1 comprises a bracket 5 and a cover portion 6, between which is mounted a flexible diaphragm 7. The diaphragm 7 has at one side a chamber 8 and at the other side a chamber 9 which is open to the atmosphere. Carried by the diaphragm is a spring seat 10 acted upon by a spring 11 in the chamber 8. The spring seat 10 has a screw-threaded extension 12 extending through an aperture in the diaphragm 7 and a bore in a clamping plate 13, a nut being provided on said extension for clamping the diaphragm between the plate 13 and the spring seat 10.

Extending into chamber 9 from the bracket 5 are a plurality of lugs 15, the ends of which are adapted to be engaged by the nut 14 for limiting the deflection of diaphragm 7 by spring 11.

Pivotally mounted on the bracket 5 is an arm or semaphore 16. Associated with the semaphore 16 is a gear 17 adapted to be operated by a gear segment 18 pivotally mounted on a pin 19 in the bracket 5 and connected by a link 20 to the end of the screw-threaded extension 12.

The spring chamber 8 of the warning device is connected through a pipe 2 to a supply pipe 3 which connects the source of braking power or the intake manifold 4 of an internal combustion engine to a brake valve device 25 of any well known construction. The brake valve device is adapted to control communication from a brake cylinder 26 through a pipe 27 to the supply pipe 3 and from said brake cylinder to the atmosphere, in order to apply and release the brakes on the vehicle in the usual, well known manner.

The spring 11 of the warning device is of predetermined value, such that when the degree of sub-atmospheric pressure in the intake manifold 4 and spring chamber 8 is satisfactory for safely controlling the brakes on the vehicle, the atmospheric pressure acting on the lower side of the diaphragm 7 is permitted to deflect said diaphragm upwardly thereby compressing spring 11. This upward deflection of diaphragm 7 rotates segment 18 in a counter-clockwise direction, and the segment 18 acting through the gear 17 turns the semaphore 16 in a clockwise direction and to a position substantially 90 degrees from that shown in the drawings.

If, for any reason, the sub-atmospheric pressure in the intake manifold 4 and the connected spring chamber 8 of the warning device 1 changes to a degree which is unsafe for brake control, the pressure of spring 11 deflects the diaphragm 7 downwardly against atmospheric pressure in chamber 9. This downward movement of said diaphragm turns the gear segment 18 in a clockwise direction and said segment in turn rotates the semaphore 16 in a counter-clockwise direction to the position shown in the drawings.

It will be noted that when the degree of pressure in the manifold 4 and supply pipe 3 is satisfactory for brake control, the semaphore 16 is in a horizontal position, but when the degree of pressure is not sufficient for safe brake control, the semaphore is turned to a vertical position.

Fig. 2 of the drawings shows a portion of the interior of a vehicle looking forward from the operator's control position. Reference numeral 21 indicates a conventional windshield, numeral 22 the framework of the vehicle body in which the windshield is mounted and numeral 23 a hollow corner post of the body. Although my improved warning device 1 may be located in various positions in the vehicle, I prefer to mount it on the body framework 22 just above the windshield 21 and directly in line with the operator's vision, so that movement of the semaphore to the dangerous, vertical position shown in the drawings will be instantly noticed by the operator. When the semaphore is in a horizontal position it will be substantially and probably entirely unnoticed by the operator, but the unusual movement of it to the vertical position will not be overlooked. Pipe 2 connecting the warning device 1 to the supply pipe 3 which is usually carried beneath the car floor, may be concealed in the body framework and cornerpost as shown.

I do not desire to have my invention limited to use with a vacuum or sub-atmospheric brake system, since by a mere reversal of the action of spring 11 on diaphragm 7, the invention can be adapted for use with a brake system using fluid at a pressure greater than that of the atmosphere.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a vehicle brake operable by a fluid pressure differential, and a source of fluid pressure differential for said brake, of a device comprising a movable member and means controlled by the pressure differential of said source for moving said member into the line of vision of the operator when the pressure differential of said source is inadequate to operate the brakes.

2. The combination with a vehicle brake operable by a fluid pressure differential, and a source of fluid pressure differential for said brake, of a device comprising a semaphore having one position for indicating when the fluid pressure differential in said source is safe for applying the vehicle brakes and another position for indicating when the fluid pressure differential in said source is unsafe for applying the brakes, and an abutment subject to variations in the pressure in said source for moving said semaphore from one position to the other position.

3. The combination with a vehicle brake operable by a fluid pressure differential, and a source of fluid pressure differential for said brake, of a device mounted adjacent the windshield of a vehicle and comprising a semaphore movable into the line of vision of the operator through the windshield when the pressure differential in said source is unsafe for operating the brakes, and an abutment for operating said semaphore, said abutment being operated by and in accordance with the difference between atmospheric pressure on one side and the pressure of said source on the other side.

4. The combination with a vehicle brake operable by a fluid pressure differential, and a source of fluid pressure differential for said brake, of a device comprising a semaphore movable to a conspicuous position when the pressure differential in said source is inadequate for applying the brakes, and movable to an inconspicuous position when the pressure differential in said source is adequate for applying the brakes, and an abutment subject to the difference in pressures of the atmosphere and said source and to the pressure of a spring for operating said semaphore from one position to the other position.

5. The combination with a vacuum brake for a vehicle, of a source of sub-atmospheric pressure for said brake, of a device for indicating the degree of vacuum in said source comprising an arm movable across the windshield of said vehicle and into the operator's line of vision when the degree of vacuum in said source is less than a predetermined amount, said arm being movable out of the operator's line of vision when the degree of vacuum is greater than said predetermined amount, a gear associated with said arm, a gear segment for turning said gear, and a movable abutment for operating said gear segment, said abutment being operated by the difference in pressures of said source and a spring on one side and the atmosphere on the other side.

In testimony whereof I have hereunto set my hand, this 6th day of December, 1930.

CLYDE C. FARMER.